United States Patent [19]
Clark, Jr.

[11] Patent Number: 6,138,406
[45] Date of Patent: Oct. 31, 2000

[54] DECORATIVE EDGING WITH AN ALIGNMENT FEATURE

[75] Inventor: Franklin T. Clark, Jr., Girard, Pa.

[73] Assignee: EMSCO Inc., Girard, Pa.

[21] Appl. No.: 09/371,144

[22] Filed: Aug. 9, 1999

[51] Int. Cl.[7] .................................................. A01G 1/08
[52] U.S. Cl. ............................................................ 47/33
[58] Field of Search ................................. 47/33; 52/102; 404/6, 7; 239/201, 276

[56] References Cited

U.S. PATENT DOCUMENTS

| | | | |
|---|---|---|---|
| 3,415,013 | 12/1968 | Galbraith | 47/73 |
| 4,281,473 | 8/1981 | Emalfarb et al. | 47/33 |
| 4,644,685 | 2/1987 | Tisbo et al. | 47/33 |
| 5,426,888 | 6/1995 | Gnaedig | 47/33 |
| 5,456,045 | 10/1995 | Bradley et al. | 47/33 |
| 5,956,892 | 9/1999 | Kownacki et al. | 47/33 |

*Primary Examiner*—Michael J. Carone
*Assistant Examiner*—Francis T. Palo
*Attorney, Agent, or Firm*—Richard K. Thomson

[57] ABSTRACT

Injection molded sections of decorative edging for use in lawn and garden applications are provided with an alignment feature to facilitate proper orientation on insertion. The edging has an arcuate upper surface which makes proper alignment difficult. This difficulty is exacerbated by the fact that the sections may be angularly positioned relative to an adjacent section through a 60° arc. The alignment feature may be etched onto the surface or molded on the surface by a modification to the mold and is positioned between ⅓ and ⅔ of the way from the lower edge to the upper surface of the edging section. The alignment feature is driven to a point just below the surface of the ground.

8 Claims, 1 Drawing Sheet

DECORATIVE EDGING WITH AN ALIGNMENT FEATURE

BACKGROUND AND SUMMARY OF THE INVENTION

The present invention relates to decorative edging for lawns and gardens. More particularly, the present invention relates to decorative edging having an alignment feature to facilitate level insertion for an improved finished appearance.

Decorative edging made of rigid plastic sections is available from a number of different sources. One such source is EMSCO, Inc., Girard, Pa., which has successfully marketed a line of edging under the trademark CHOPPERS. One problem with this edging is that because of its arcuate upper surface, achieving proper orientation when hammering the section into the soil is difficult.

The present invention overcomes this problem by providing a linear alignment means extending laterally across at least one of the faces of the section. Preferably, the linear alignment means extends across each front and back face to enable installation from either side of the edging. This alignment means may be etched onto the surface or may be a discontinuity formed in the face at the time of molding by putting a ridge or groove in the mold face.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT

Figure 2:
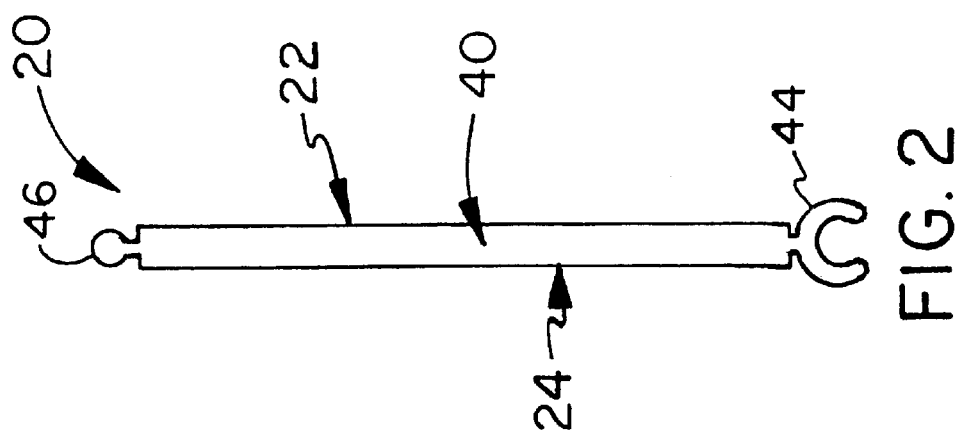
FIG. 2 is a top plan view of the edging of the first embodiment.
Figure 1:
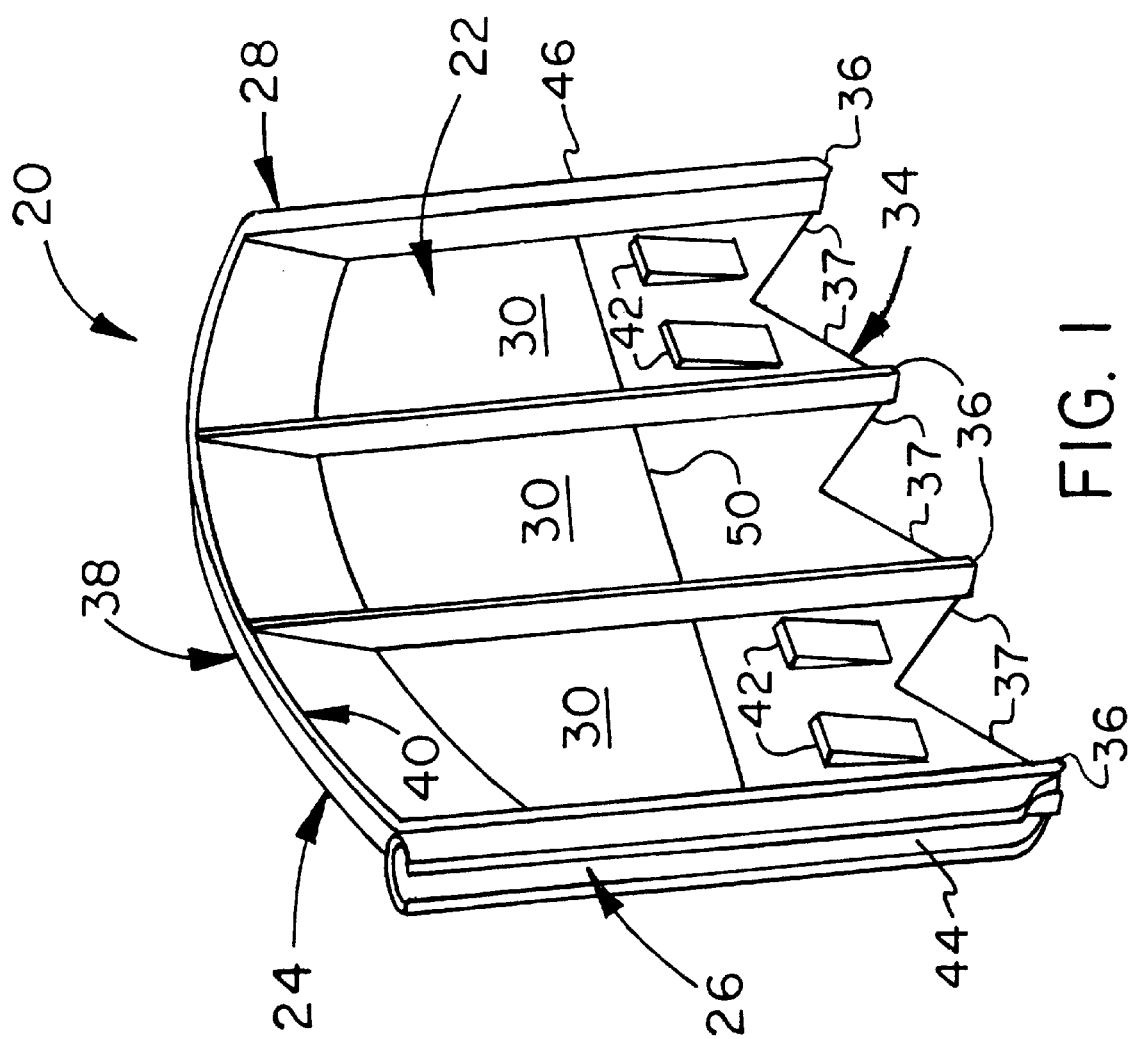
FIG. 1 is a perspective view of a first embodiment of the decorative edging of the present invention.

A section of the first embodiment of the decorative edging of the present invention is shown in FIGS. 1 and 2 generally at 20. Each rigid section 20 of the decorative edging is comprised of a member having a front face 22 and a back face 24 extending between lateral edges 26 and 28. Sections 20 are injected molded using a plastic material such as PVC. Each of the faces 22 and 24 is made up of a plurality of generally planar surface regions 30 interconnected by reinforcing columns 32. Lower edge 34 has means to facilitate insertion into the soil, namely a series of V-shaped points 36 with cutting edges 37 formed along each arm of the V. Upper surface 38 is arcuate over at least a portion of its length which extends between lateral edges 26 and 28 and preferably is equipped with a laterally extending flange 40 which can receive hammer blows for effecting insertion.

Front (22) and back (24) faces are equipped with removal resistance means in the form of a plurality of tapered protrusions 42 extending from generally planar surface regions 30. Although pairs of protrusions 42 have been depicted as extending from the same side in each generally planar surface region 30 for the ease of illustration, it is preferred that each region 30 have one protrusion 42 extending in each opposing direction. Means are provided for interconnecting adjacent sections 20 in the form of a C-shaped channel 44 integral with first lateral edge 26 and a cylindrical pin 46 integral with second lateral edge 28. Pin 46 is slid vertically into channel 44 to effect connection between adjacent sections 20. C-shaped channel 44 is configured to permit ±30° angular displacement between adjacent sections 20 to permit borders to have a non-linear configuration.

While the arcuate upper surface 38 provides a decorative feature for the section 20, it provides a challenge for the installer to achieve proper alignment. Accordingly, the edging section 20 is equipped with a linear alignment means 50 extending laterally across at least one of the front (22) and back (24) faces. Preferably, linear alignment means 50 is formed across each of faces 22 and 24 allowing the user flexibility to effect insertion from either side of edging 20. Linear alignment means 50 can take the form of a line etched onto faces 22 and 24 or may be formed as a discontinuity in the injected molded part by providing a ridge or channel in the mold face (not shown). This alignment means 50 will normally be positioned between ⅓ and ⅔ of the way between the lower edge 34 and upper surface 38 with the intent that the edging section 20 be driven into the ground until alignment means 50 just disappears beneath the surface of the ground. This feature enables the user to achieve proper alignment of each section 20 regardless of the angular positioning of adjacent sections.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A rigid section of decorative garden edging comprising:
   a) a member having front and back faces extending between first and second lateral edges, each said face having a plurality of vertically extending, generally planar surface regions interconnected by reinforcing columns;
   b) a lower edge having means to facilitate insertion into soil;
   c) a laterally extending flange extending along an upper surface capable of receiving hammer blows to accomplish insertion into the soil, said laterally extending flange extending between said first and second lateral edges and being continuously convexly arcuate over at least a major portion thereof;
   d) means formed on said front and back faces for resisting withdrawal from the soil;
   e) means for interconnecting said section to an adjacent section;
   f) a linear alignment means extending laterally across at least one of said front and back faces facilitating proper orienting, as said continuously convexly arcuate, laterally extending flange receives hammer blows during insertion into the soil, said linear alignment means being adapted to disappear below the surface of the soil.

2. The section of claim 1 wherein said linear alignment means extends laterally across each of said front and back faces of said section.

3. The section of claim 1 wherein said linear alignment means comprises a line etched on at least one of said front and back faces.

4. The section of claim 1 wherein said linear alignment means comprises a line formed on said at least one of said front and back faces by a discontinuity in a mold used for making said section.

5. The section of claim 1 wherein said means to resist withdrawal comprise protrusions extending from said generally planar surface regions on said front and back faces.

6. The section of claim 1 wherein said means to facilitate insertion comprises a plurality of V-shaped points with cutting edges formed along the faces of said V-shaped points.

7. The section of claim 1 wherein said means for connecting said section to an adjacent section comprises a C-shaped channel extending along said first lateral edge and a cylindrical pin integrally attached to said second lateral edge, said pin being receivable in said C-shaped channel.

8. The section of claim 1 wherein the linear alignment means is positioned between $\frac{1}{3}$ and $\frac{2}{3}$ of the distance between said lower edge and said upper surface of said section.

* * * * *